US010826855B2

(12) United States Patent
Maddipati (10) Patent No.: US 10,826,855 B2
(45) Date of Patent: Nov. 3, 2020

(54) COMPUTING SYSTEM WITH AN EMAIL PRIVACY FILTER AND RELATED METHODS

(71) Applicant: CITRIX SYSTEMS, INC., Fort Lauderdale, FL (US)

(72) Inventor: Srinivasa Maddipati, San Jose, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 25 days.

(21) Appl. No.: 16/165,130

(22) Filed: Oct. 19, 2018

(65) Prior Publication Data

US 2020/0127953 A1  Apr. 23, 2020

(51) Int. Cl.
*H04L 12/58* (2006.01)
*G06F 21/62* (2013.01)
*H04L 29/08* (2006.01)

(52) U.S. Cl.
CPC .......... *H04L 51/12* (2013.01); *G06F 21/6245* (2013.01); *H04L 51/22* (2013.01); *H04L 67/22* (2013.01)

(58) Field of Classification Search
CPC ........ H04L 67/22; H04L 51/22; H04L 61/307
See application file for complete search history.

(56) References Cited

U.S. PATENT DOCUMENTS

| | | | | |
|---|---|---|---|---|
| 7,523,309 B1 * | 4/2009 | Talbot | ................... | H04L 63/105 713/164 |
| 8,448,246 B2 * | 5/2013 | Guerrero | ............. | G06Q 10/107 726/22 |
| 9,176,744 B2 | 11/2015 | Lee | | |
| 9,538,345 B2 | 1/2017 | Sah et al. | | |
| 9,721,087 B1 * | 8/2017 | Duchin | ................... | G06F 21/45 |
| 10,523,710 B2 * | 12/2019 | Sinha | ................... | H04L 63/1433 |
| 2003/0008662 A1 * | 1/2003 | Stern | ................. | H04M 1/72572 455/456.1 |
| 2004/0019780 A1 * | 1/2004 | Waugh | ................ | H04L 63/0428 713/152 |
| 2004/0162882 A1 * | 8/2004 | Mora | ...................... | G06Q 10/10 709/207 |
| 2012/0110345 A1 * | 5/2012 | Pigeon | ................ | H04L 63/0435 713/189 |
| 2013/0151630 A1 | 6/2013 | Lawrence-Apfelbaum | | |
| 2014/0020047 A1 * | 1/2014 | Liebmann | ............... | H04L 63/20 726/1 |
| 2018/0048595 A1 | 2/2018 | Dotan-Cohen et al. | | |

* cited by examiner

*Primary Examiner* — Chirag R Patel
(74) *Attorney, Agent, or Firm* — Allen, Dyer, Doppelt + Gilchrist, PA (57) ABSTRACT

A computing system includes a server comprising email policy rules to be applied to emails containing sensitive information, a mail server to provide the emails, and a client computing device enrolled with the server to access the mail server. An email privacy filter is to be applied to emails from the mail server intended for the client computing device. The email privacy filter interfaces with the server to receive the email policy rules therefrom. The email privacy filter identifies sensitive information within the email. The email privacy filter then applies the email policy rules, in response to identification of sensitive information within the email, to determine if the email is to be hidden from view on the client computing device so as to prevent display of the sensitive information to an unauthorized viewer.

20 Claims, 5 Drawing Sheets

COMPUTING SYSTEM WITH AN EMAIL PRIVACY FILTER AND RELATED METHODS

TECHNICAL FIELD

The present disclosure relates to computing systems, and more particularly, to an email privacy filter to be applied to emails having sensitive information and related methods.

BACKGROUND

Emails accessed on a client computing device are generally displayed when selected by a user of the client computing device. If a received email includes sensitive information and is displayed on the client computing device in a public place, then this may allow for leakage of the sensitive information to others within viewing distance of the client computing device.

Another scenario is when a display of the client computing device is shared with others in a meeting. Generally, an email notification message is displayed indicating receipt of a new email, and this email notification message would also be shared with others in the meeting. If the new email contains sensitive information, then there may be leakage if the new email notification message includes a portion of the sensitive information. Also, the new email may inadvertently be opened thereby leaking the sensitive information.

SUMMARY

A computing system includes a server comprising email policy rules to be applied to emails containing sensitive information, a mail server configured to provide the emails, and a client computing device enrolled with the server and configured to access the mail server. An email privacy filter is applied to emails from the mail server intended for the client computing device. The email privacy filter interfaces with the server to receive the email policy rules therefrom. The email privacy filter determines if the email contains sensitive information, and if the email contains sensitive information, then apply the email policy rules to determine if the email is to be hidden from view on the client computing device so as to prevent display of the sensitive information to an unauthorized viewer. The email privacy filter advantageously prevents display of emails with sensitive information to unauthorized viewers.

The server comprises at least one of a unified endpoint management (UEM) server, an enterprise mobility management (EMM) server, and a mobile device management (MDM) server.

The mail server includes the email privacy filter when the client computing device is configured to access the mail server using a browser or a native application or any email client application without any built-in capabilities. In other embodiments, the client computing device includes the email privacy filter when the client computing device is configured to access the mail server using a secure browser and a virtual private network (vpn).

The email privacy filter compares contents of the email to a sensitive word database, and if the email contains at least one of the sensitive words in the sensitive word database, then the email is determined to contain sensitive information. The sensitive word database is not limited to words, and may include numbers and symbols, for example.

The email privacy filter may also determine if the email includes a sensitivity tag, and if the email contains a sensitivity tag, then the email is determined to contain sensitive information.

The email privacy filter, in some applications, receives a location of the client computing device, and applies the email policy rules based on the location of the client computing device. The email privacy filter may also receive calendar information of scheduled meetings for a user of the client computing device, and applies the email policy rules based on the scheduled meetings.

The client computing device includes a display, and generates a notification message for display indicating that an email having sensitive information has been received and is hidden from view.

The client computing device may include an input device, and displays the hidden email having sensitive information based on an authorization code entered via the input device. The input device may be a keyboard or a pointing device, for example. The client computing device may include a camera and facial recognition software, and displays the hidden email having sensitive information based on facial recognition of an authorized user of the client computing device. The client computing device may include a microphone and voice recognition software, and displays the hidden email having sensitive information based on voice recognition of an authorized user of the client computing device.

Another aspect is directed to a method for operating an email privacy filter within a computing system as described above. The method includes applying the email privacy filter to emails from the mail server intended for the client computing device, with the email privacy filter interfacing with the server to receive the email policy rules therefrom. The email privacy filter identifies sensitive information within the email. The email privacy filter also applies the email policy rules, in response to identification of sensitive information within the email, to determine if the email is to be hidden from view on the client computing device so as to prevent display of the sensitive information to an unauthorized viewer.

Yet another aspect is directed to a non-transitory computer readable medium for operating an email privacy filter within a computing system as described above, and with the non-transitory computer readable medium having a plurality of computer executable instructions for causing the email privacy filter to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
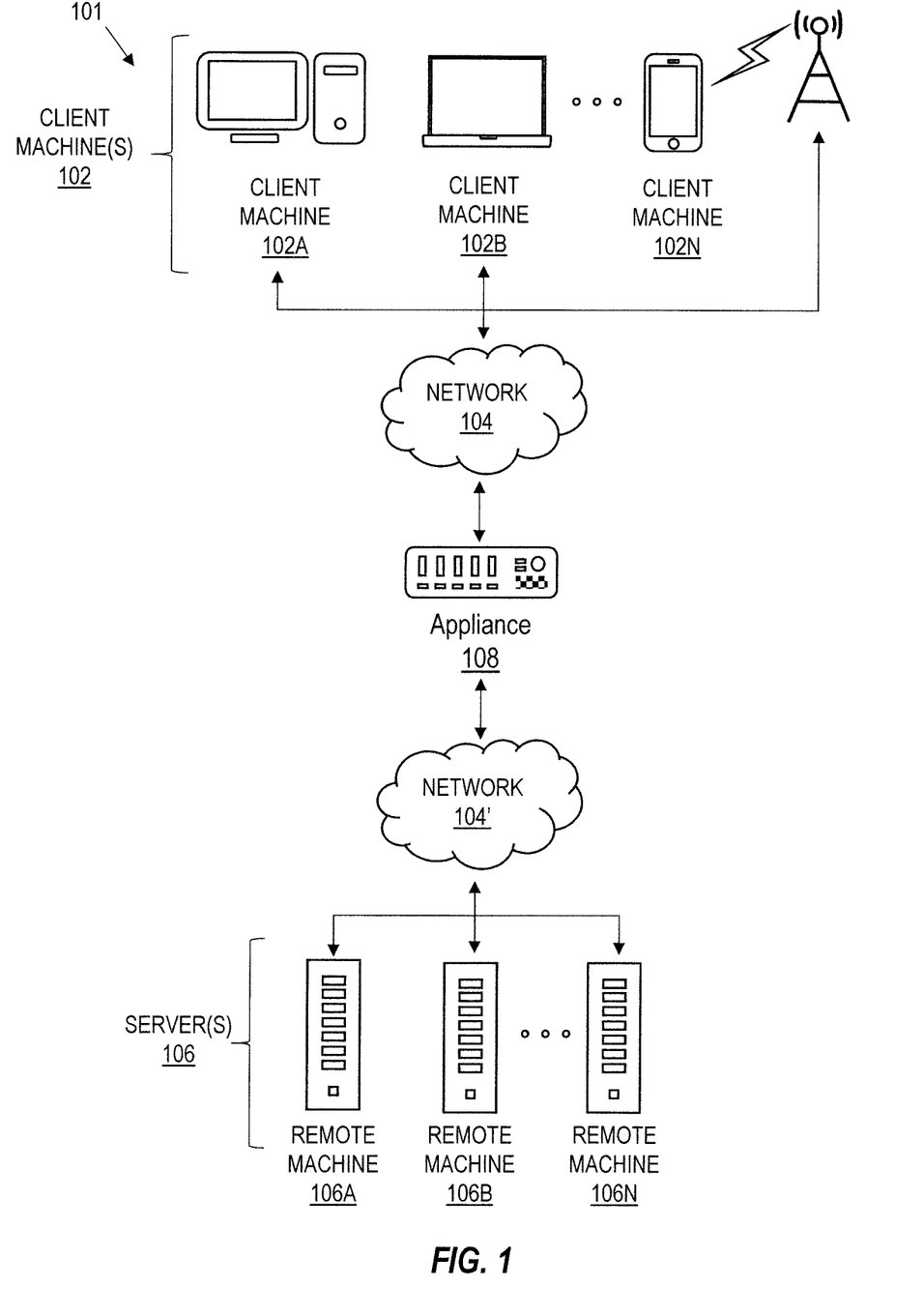
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
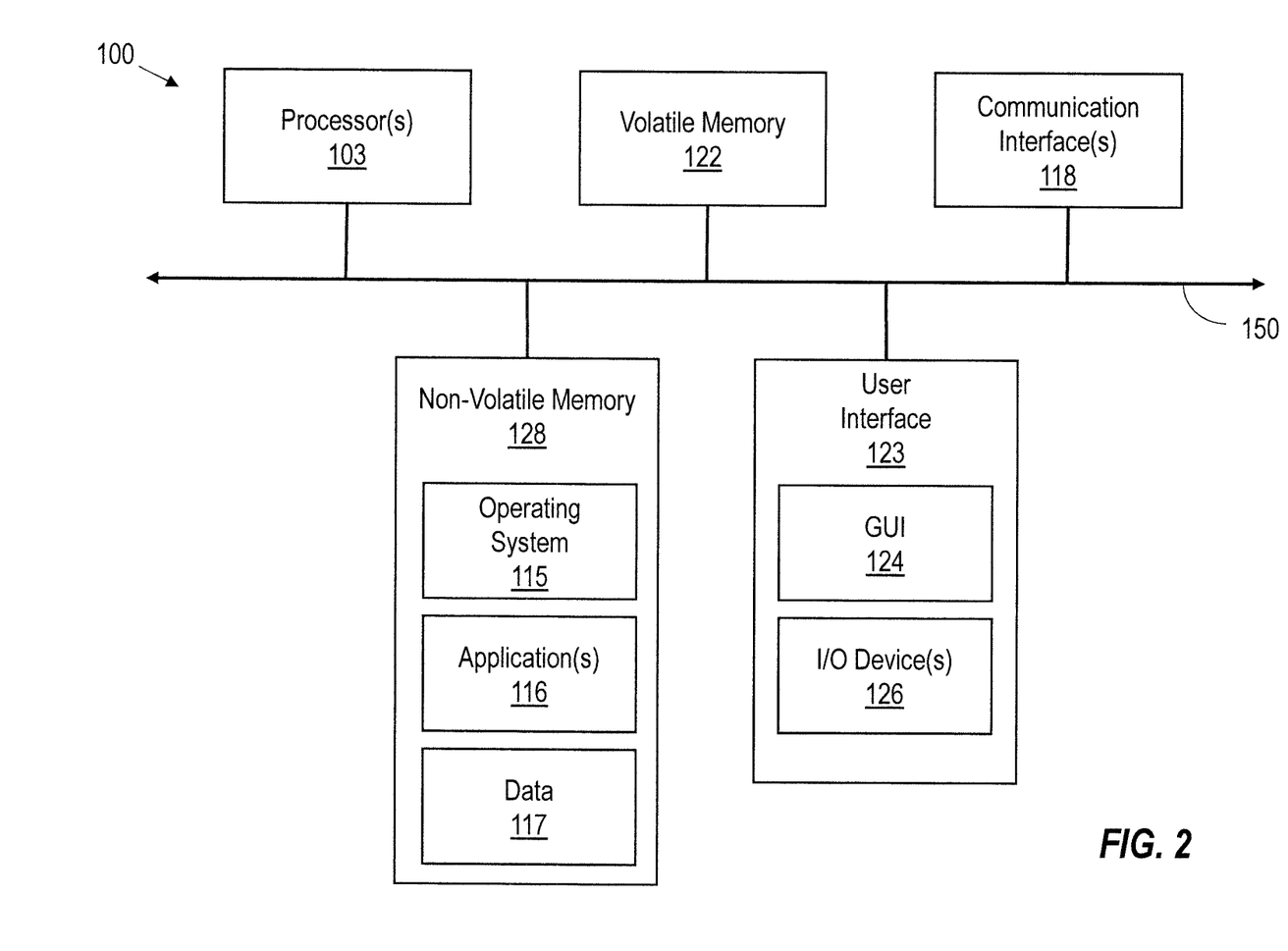
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
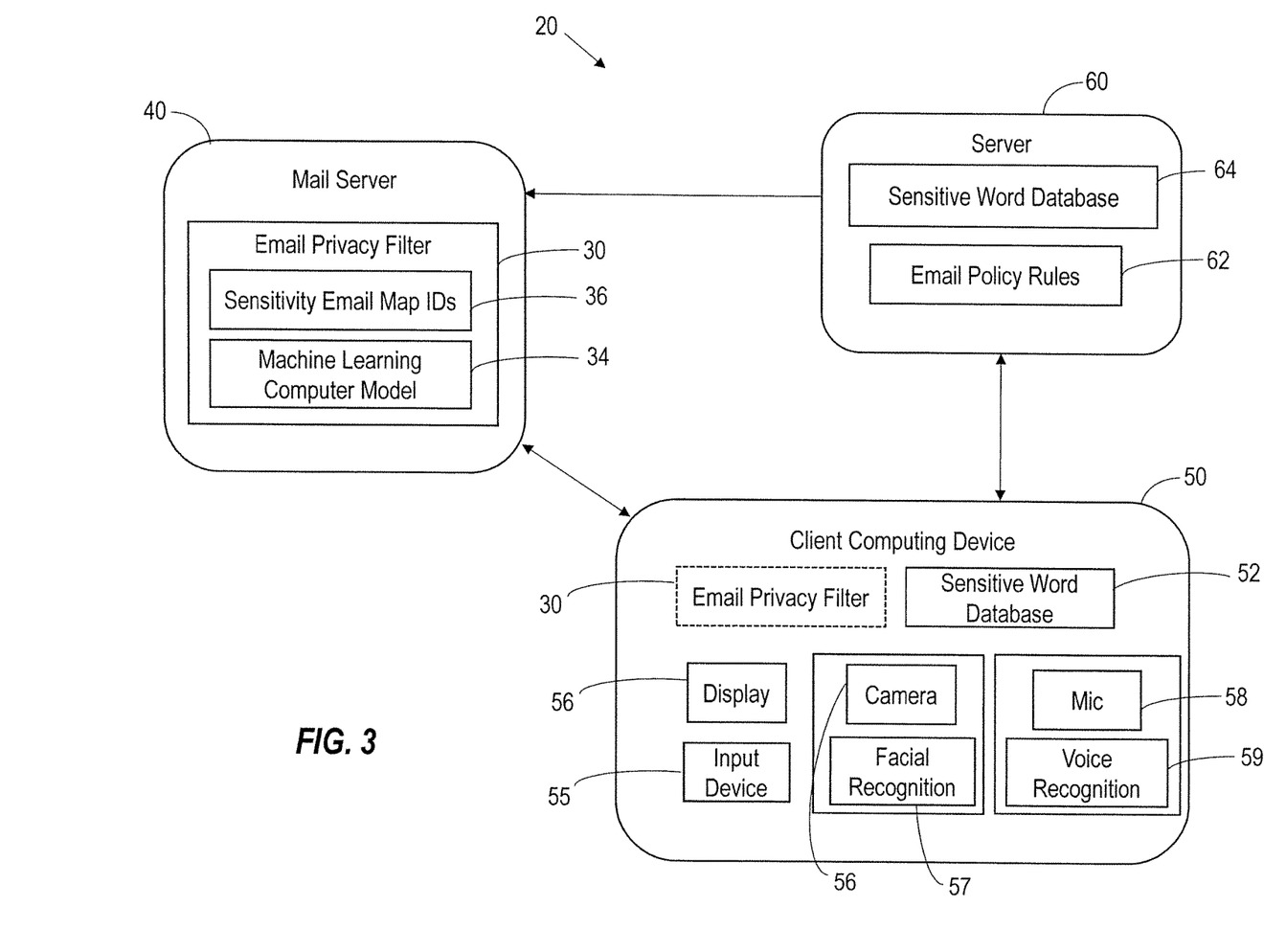
FIG. 3 is a block diagram of a computing system with an email privacy filter in which various aspects of the disclosure may be implemented.

Referring to FIG. 3, a computing system 20 with an email privacy filter 30 will now be discussed. Emails accessed on a client computing device 50 are generally displayed when selected by a user of the client computing device 50. Problems may arise when the displayed emails include sensitive information. Depending on the location of the client computing device 50, this may allow leakage of the sensitive information to others within viewing distance of the client computing device 50. As will be explained in detail below, the email privacy filter 30 advantageously prevents display of the sensitive information to unauthorized viewers. Sensitive information, for example, may include personal data, salary history, social security numbers, passwords, and work related information.

The email privacy filter 30 may be on the mail server 40 as illustrated in FIG. 3, or may optionally be located on the client computing device 50 as indicated by the email privacy filter 30 marked with dashed lines. In other embodiments, the mail server 40 may be combined with the server 60.

The mail server 40 may be an exchange server. The mail server 40 includes the email privacy filter 30 when the client computing device is configured to access the mail server 40 using a browser or a native application or any email client application without any built-in capabilities. The client computing device 50 includes the email privacy filter 30 when the client computing device 50 is configured to access the mail server 40 using a secure browser and a virtual private network (vpn), such as Citrix secure mail. In yet other embodiments, the email privacy filter 30 may be deployed on a separate server acting like a proxy intercepting the emails.

The email privacy filter 30 filters the received emails based on content and based on contextual information. Content is directed to the substance of the emails, whereas the context is directed to a location of where the emails are to be viewed. Content of the emails is first examined to determine if sensitive information is in the emails. For emails that include sensitive information, contextual information, such as device location and calendar information of scheduled meetings, is then used to determine if the emails are to be hidden from view on the client computing device 45 so as to prevent display of the sensitive information to unauthorized viewers.

The illustrated computing system 20 includes a mail server 40, a client computing device 50 to receive emails from the mail server 40, an email privacy filter 30 that is applied to the received emails, and a server 60 that provides email policy rules 62 to the email privacy filter 30. The email policy rules 62 determine how the emails with sensitive information are to be treated based on the contextual information associated with the client computing device 50 at the time the email is received and accessed by the user for viewing.

The email policy rules 62 are not applied to emails that do not include sensitive information. These emails along with their notification messages are displayed without any restrictions.

The client computing device 50 is enrolled with the server 60 and is configured to access the mail server 40. The server 60 includes the email policy rules 62 that are provided to the email privacy filter 30 which are applied to emails containing sensitive information. The email policy rules 62 are generally defined and implemented by an administrator of the server 60.

The server 60 is part of an enterprise access/security system. The server 60 may be a unified endpoint management (UEM) server, an enterprise mobility management (EMM) server, or a mobile device management (MDM) server, for example. Even though only one client computing device 50 is illustrated as being enrolled with the server 60, there is no limit to the number of devices that may be enrolled.

Generally speaking, the EMM or UEM servers may provide a MDM platform for providing access by the client computing device 50 to shared applications. The shared applications may be hosted/managed, Web, and SaaS applications. The EMM platform may include the MDM platform along with a secure container to keep enterprise data secure. Also, the EMM platform may utilize a UEM platform to secure client endpoints such as laptops, smartphones, tablets, desktop computers, printers and wearables from a single source.

Since the client computing device 50 is enrolled with the server 60, this advantageously allows contextual information of the client computing device 50 to be determined. The contextual information along with the email policy rules 62 are then provided to the email privacy filter 30.

Enrollment of the client computing device 50 with the server 60 allows location of the client computing device 50 to be provided to the email privacy filter 30. The server 60 is able to query the client computing device 50 for its location. The client computing device may provide its GPS coordinates. In the absence of GPS, the IP address of the client computing device 50 may be used. Also, information obtained from the client computing device 50 accessing Wi-Fi networks and communicating with fixed tracking/positional devices can provide location of the client computing device 50.

Other contextual information may be determined by the server 60 and provided to the email privacy filter 30. For example, when the user of the client computing device 50 is in a scheduled meeting with other attendees, the server 60 is able to determine who the other attendees are based on who all received the meeting invite. The other attendees may or may not be cleared to view the sensitive information within the emails. If they are all cleared to view the sensitive information, then the email is displayed. If one or more are not cleared to view the sensitive information, then the email is not displayed.

The email privacy filter 30 is to be applied to emails from the mail server 40 intended for the client computing device 50, with the email privacy filter 30 interfacing with the server 60 to receive the email policy rules 62 therefrom. The email privacy filter 30 first determines, for each email, if the email contains sensitive information.

Determination of sensitive information within an email may be based on several approaches. One approach is for the email privacy filter 30 to compare contents of the email to a sensitive word database. A sensitive word database 54 may be defined by a user of the client computing device 50, and a sensitive word database 64 may be defined by an administrator of the server 60. Both of these sensitive word database 54, 64 are provided to the email privacy filter 30. Sensitive words may be salary and social security number, for example. Sensitive words may be related to a particular program or project that is be kept confidential.

Yet another approach to determine if an email includes sensitive information is to feed the email into a machine learning computer model 34. The machine learning computer model 34 may be on the email privacy filter 30, as illustrated. In other embodiments, the machine learning computer model 34 may be on the client computing device, or there may be multiple machine learning computer models 34.

The machine learning computer model 34 may be created using supervised learning (classification) by feeding the data (e.g., emails) prepared using classification by humans and also using automated processing of content by looking for keywords. The machine learning computer model 34 will continue to learn based on the user updating sensitivity tags. A sensitivity tag is an attribute of an email message that can be set by either a user or the email privacy filter 30. This may be based on criteria such as the presence of certain keywords found in the email content or by a machine learning algorithm. The sensitivity tags added as optional attributes to the message may also cached on the client computing device 50 or the server 60.

This supervised learning of the machine learning computer model 34 helps the model to learn what is sensitive information within these emails. As more emails with sensitive information are examined, then the machine learning computer model 34 becomes more accurate in determining sensitive information in emails. A combination of the sensitive word databases 54, 64 and the machine learning computer model 34 may be used by the email privacy filter 30. Consequently, the email privacy filter 30 can continuously learn to categorize the mails and determine sensitivity using machine learning and with the user tagging emails as being sensitive.

The email privacy filter 30 also includes a map of email IDs 36 for emails that include sensitive information. If a previous email has already been identified by the email privacy filter 30 as having sensitive information is received again by the client computing device 50, then this email is identified from the map of email IDs 36 without having to compare the email to the sensitive word databases 54, 64 or being applied to the machine learning computer model 34. For example, this may be the case in which a reply is made to an email classified as containing sensitive information. Another example is when an email is sent to multiple users at once, and the email would be analyzed just once despite it being sent to multiple users.

Also, if a received email is tagged or flagged as including sensitive information, then the email does not need to be compared to the sensitive word databases 54, 64 or applied to the machine learning computer model 34. Any email may be tagged or flagged as being sensitive by the user. Once the email privacy filter 30 categorizes an email as having sensitive information, then the email policy rules 62 are applied.

The email policy rules 62, in some applications, are applied based on contextual information of the client computing device 50. As noted above, the email privacy filter 30 receives a location of the client computing device 50. The email policy rules 62 are applied based on the location of the client computing device 50. For example, if the user of the client computing device 50 is at the office or at home and receives an email having sensitive information, then the email is allowed to be displayed on the client computing device 50 because these locations have been identified in the system as being safe for display of classified information.

Alternatively, if the user of the client computing device 50 is at a coffee shop or grocery store and receives an email having sensitive information, then the email is to be hidden from view on the client computing device 50 so as to prevent display of the sensitive information to an unauthorized viewer. The locations of the coffee shop or grocery store may be predetermined by the system. Alternatively, the system may treat areas outside of known areas (that are permissible for viewing sensitive information) as unknown areas (that are not permissible for viewing sensitive information, such as locations of the coffee shop or grocery store).

The client computing device includes a display 56, and is configured to generate a notification message for display indicating that an email having sensitive information has been received and is hidden from view. As will be explained below, the user may override the email privacy filter 30 so as to display the email having sensitive information.

The email privacy filter 30 is also configured to receive calendar information of scheduled meetings for a user of the client computing device 50, and to apply the policy rules 62 based on the scheduled meetings. If the user of the client computing device 50 receives an email having sensitive information while attending a scheduled meeting, then the email is to be hidden from view so as to prevent display of the sensitive information to an unauthorized viewer.

However, the server 60 is able to determine who the other attendees are based on who all received the initial meeting invite. Consequently, if the other attendees are permitted to view the email having sensitive information, then the policy rules 62 would allow the email to be displayed.

The email privacy filter 30 may be selectively activated and deactivated. This may be based on input from an administration of the server 60, and/or from the user of the client computing device 50. Also, the email privacy filter 30 may have adjustable sensitivity levels that are selected by the administrator and/or the user of the client computing device 50.

When the user of the client computing device 50 receives a notification message indicating that an email having sensitive information has been received and is hidden from view, the user may override the email privacy filter 30 so as to display the email having sensitive information. Overriding the email privacy filter 30 may be performed by several different approaches.

One approach is based on the client computing device 50 including an input device 55, and the user enters an authorization code or password via the input device 55. The input device may be a keyboard or a pointing device, for example. Another approach is based on the client computing device 50 including a camera 56 and facial recognition software 57, and the hidden email having sensitive information is displayed upon facial recognition of an authorized user of the client computing device 50. Yet another approach is based on the client computing device 50 including a microphone 58 and voice recognition software 59, and the hidden email having sensitive information is displayed upon voice recognition of an authorized user of the client computing device 50.

Figure 4:
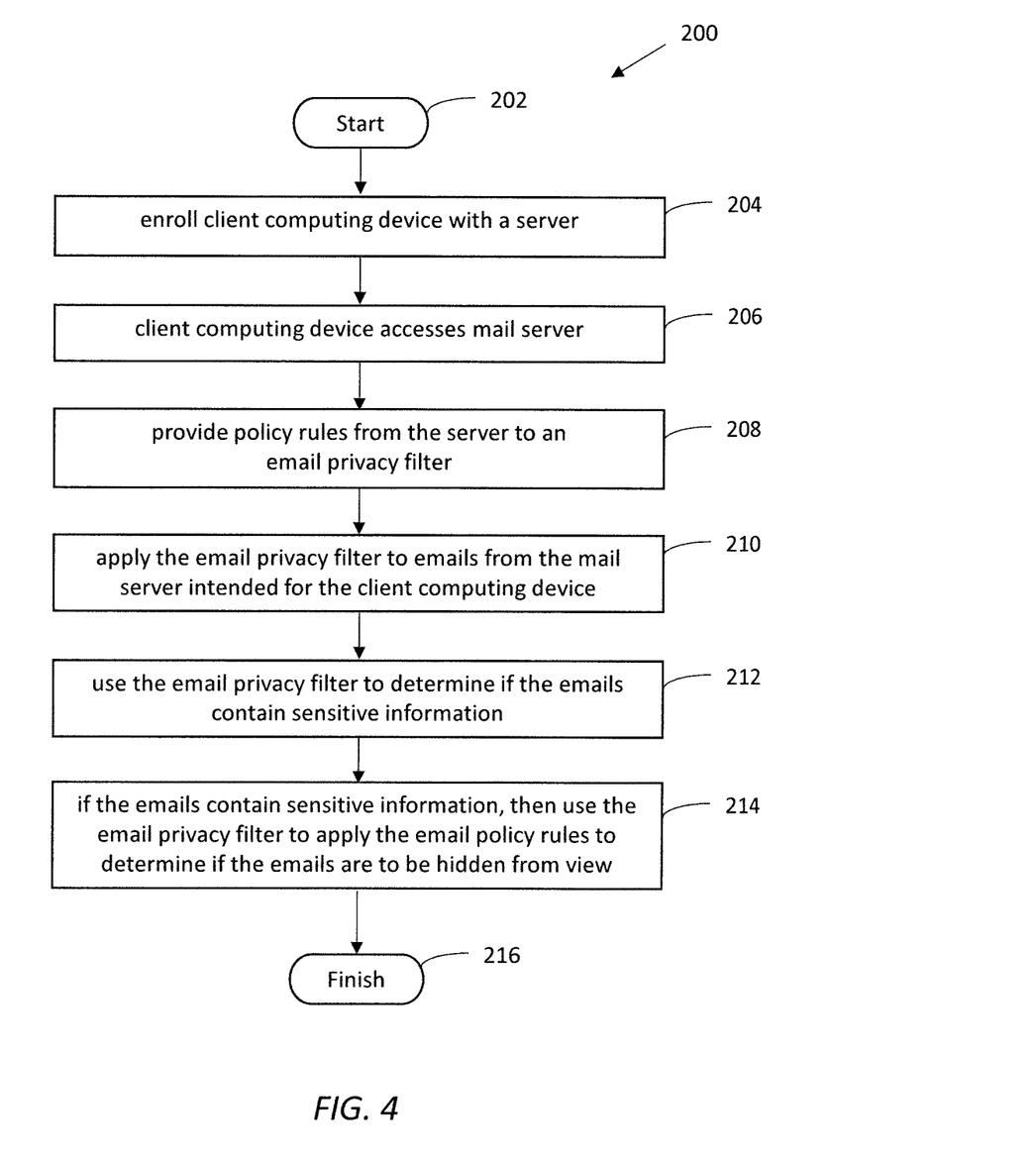
FIG. 4 is a flowchart illustrating a method for operating the computing system with the email privacy filter illustrated in FIG. 3.

Referring now to the flowchart 200 in FIG. 4, another aspect of the disclosure is directed to a method for operating the computing system 20 that includes, from the start (Block 202), enrolling a client computing device 50 with the server 60 at Block 204, and the client computing device 50 accesses emails from the mail server 40 at Block 206. Email policy rules 62 are provided from the server 60 to the email privacy filter 30 at Block 210. The email privacy filter 30 is applied to emails from the mail server 40 intended for the client computing device 50 at Block 212. The email privacy filter 30 is used to determine if the emails contains sensitive information at Block 214. If the emails contains sensitive information, then the email privacy filter 30 is used to apply the email policy rules to determine if the emails are to be hidden from view on the client computing device 50. The method ends at Block 216.

Figure 5:
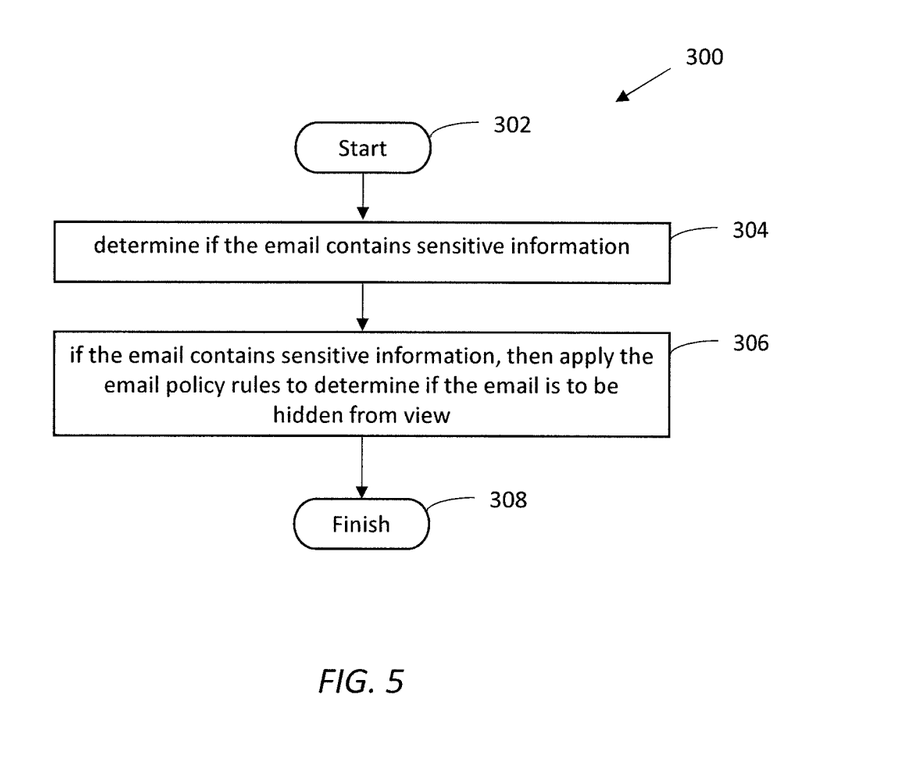
FIG. 5 is a flowchart illustrating a method for operating the email privacy filter illustrated in FIG. 3.

Referring now to the flowchart 300 in FIG. 5, a method for operating the email privacy filter 30 includes, from the start (Block 302), determining if the email contains sensitive information at Block 304. If the email contains sensitive information, then the email policy rules 62 are applied at Block 306 to determine if the email is to be hidden from view on the client computing device 50 so as to prevent display of the sensitive information to an unauthorized viewer. The method ends at Block 308.

Another aspect of the disclosure is directed to a non-transitory computer readable medium for operating an email privacy filter 30 within a computing system 20 as described above. The non-transitory computer readable medium has a plurality of computer executable instructions for causing the email privacy filter 30 to determine if the email contains sensitive information, and if the email contains sensitive information, then apply the email policy rules 62 to determine if the email is to be hidden from view on the client computing device 50 so as to prevent display of the sensitive information to an unauthorized viewer.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing system comprising:
    a server comprising email policy rules to be applied to emails containing sensitive information;
    a mail server configured to provide the emails;
    a client computing device enrolled with said server and configured to access said mail server; and
    an email privacy filter to be applied to emails from said mail server intended for said client computing device, with the email privacy filter interfacing with said server to receive the email policy rules therefrom and configured to perform the following for each email:
    identify sensitive information within the email, and
    apply the email policy rules, in response to identification of sensitive information within the email, to determine that the email is to be hidden from view on said client computing device after receipt of the email so as to prevent display of the sensitive information to an unauthorized viewer.

2. The computing system according to claim 1 wherein said server comprises at least one of a unified endpoint management (UEM) server, an enterprise mobility management (EMM) server, and a mobile device management (MDM) server.

3. The computing system according to claim 1 wherein said mail server includes the email privacy filter when said client computing device is configured to access said mail server using a browser or a native application.

4. The computing system according to claim 1 wherein said client computing device includes the email privacy filter when said client computing device is configured to access said mail server using a secure browser and a virtual private network (vpn).

5. The computing system according to claim 1 wherein the email privacy filter is further configured to compare contents of the email to a sensitive word database, and if the email contains at least one of the sensitive words in the sensitive word database, then the email is determined to contain sensitive information.

6. The computing system according to claim 1 wherein the email privacy filter is further configured to determine if the email includes a sensitivity tag, and if the email contains a sensitivity tag, then the email is determined to contain sensitive information.

7. The computing system according to claim 1 wherein the email privacy filter is further configured to receive a location of said client computing device, and to apply the email policy rules based on the location of said client computing device.

8. The computing system according to claim 1 wherein the email privacy filter is further configured to receive calendar information of scheduled meetings for a user of said client computing device, and to apply the email policy rules based on the scheduled meetings.

9. The computing system according to claim 1 wherein said client computing device comprises a display, and is further configured to generate a notification message for display indicating that an email having sensitive information has been received and is hidden from view.

10. The computing system according to claim 9 wherein said client computing device comprises an input device, and is further configured to display the hidden email having sensitive information based on an authorization code entered via said input device.

11. The computing system according to claim 9 wherein said client computing device comprises a camera and facial recognition software, and is further configured to display the hidden email having sensitive information based on facial recognition of an authorized user of said client computing device.

12. The computing system according to claim 9 wherein said client computing device comprises a microphone and voice recognition software, and is further configured to display the hidden email having sensitive information based on voice recognition of an authorized user of said client computing device.

13. A method for operating an email privacy filter within a computing system comprising a server comprising email policy rules to be applied to emails containing sensitive information; a mail server configured to provide the emails; and a client computing device enrolled with the server and configured to access the mail server, the method comprising:
    applying the email privacy filter to emails from the mail server intended for the client computing device, with the email privacy filter interfacing with the server to receive the email policy rules therefrom and perform the following for each email:
    identify at least one of a sensitivity tag associated with the email, and sensitive information within the email based on comparing contents of the email to a sensitive word database, and
    apply the email policy rules, in response to identification of the sensitivity tag associated with the email or to identification of the sensitive information within the email, to determine that the email is to be hidden from view on the client computing device after receipt of the email so as to prevent display of the sensitive information to an unauthorized viewer.

14. The method according to claim 13 wherein the mail server includes the email privacy filter when the client computing device is configured to access the mail server using a browser or a native application.

15. The method according to claim 13 wherein the client computing device includes the email privacy filter when the client computing device is configured to access the mail server using a secure browser and a virtual private network (vpn).

16. The method according to claim 13 wherein determining if the email contains sensitive information comprises determining if the email includes a sensitivity tag, and if the email contains a sensitivity tag, then the email is determined to contain sensitive information.

17. The method according to claim 13 further comprising receiving at the email privacy filter a location of the client computing device, and to apply the email policy rules based on the location of the client computing device.

18. The method according to claim 13 further comprising receiving at the email privacy filter calendar information of scheduled meetings for a user of the client computing device, and to apply the email policy rules based on the scheduled meetings.

19. A non-transitory computer readable medium for operating an email privacy filter within a computing system comprising a server comprising email policy rules to be applied to emails containing sensitive information; a mail server configured to provide the emails; and a client computing device enrolled with the server and configured to access the mail server, and with the non-transitory computer readable medium having a plurality of computer executable instructions for causing the email privacy filter to perform steps comprising:
    applying the email privacy filter to emails from the mail server intended for the client computing device, with the email privacy filter interfacing with the server to receive the email policy rules therefrom and perform the following for each email:
    identify sensitive information within the email, and
    apply the email policy rules, in response to identification of sensitive information within the email, to determine that the email is to be hidden from view on the client computing device after receipt of the email so as to prevent display of the sensitive information to an unauthorized viewer.

20. The non-transitory computer readable medium according to claim 19 wherein the email privacy filter is further configured to determine if the email includes a sensitivity tag, and if the email contains a sensitivity tag, then the email is determined to contain sensitive information.

* * * * *